United States Patent
Nowak et al.

(10) Patent No.: US 6,262,391 B1
(45) Date of Patent: *Jul. 17, 2001

(54) WIRE FEEDER WITH NON-LINEAR SPEED CONTROL

(75) Inventors: Albert M. Nowak, Appleton; Thomas G. Yunk, Shiocton; Warren E. Herwig, Oshkosh, all of WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/415,878

(22) Filed: Oct. 8, 1999

Related U.S. Application Data

(63) Continuation of application No. 08/911,998, filed on Aug. 15, 1997, now Pat. No. 5,990,447.

(51) Int. Cl.[7] .................................................. B23K 9/12
(52) U.S. Cl. ........................................................ 219/137.71
(58) Field of Search ..................... 219/137.71, 124.03, 219/132, 130.21, 130.31, 137.7

(56) References Cited

U.S. PATENT DOCUMENTS

| | | |
|---|---|---|
| 2,223,177 | 11/1940 | Jones . |
| 3,509,314 | 4/1970 | Freytag . |
| 3,989,921 | 11/1976 | Ohi et al. . |
| 4,216,367 | 8/1980 | Risberg . |
| 4,427,874 * | 1/1984 | Tabata et al. ................... 219/137.71 |
| 4,430,551 | 2/1984 | Toth . |
| 4,608,482 | 8/1986 | Cox et al. . |
| 5,834,733 | 11/1998 | Oyama et al. . |
| 5,990,447 * | 11/1999 | Nowak et al. ................... 219/137.71 |

* cited by examiner

*Primary Examiner*—Clifford C. Shaw
(74) *Attorney, Agent, or Firm*—George R. Corrigan

(57) ABSTRACT

A welding machine with a wire feeder and a controller is disclosed. The wire feeder includes a wire feed motor with a motor speed input. The controller is coupled to the motor speed control input. A user selectable wire feed speed input is also connected to the controller. The controller has an input circuit coupled with a non-linear stage such that the relationship between the user selectable wire feed speed input and the actual wire feed speed is not linear. The selectable input may be a potentiometer mounted on a front panel as the user selectable wire feed speed input. The non-linearity may be continuous or two discrete gains.

37 Claims, 2 Drawing Sheets

WIRE FEEDER WITH NON-LINEAR SPEED CONTROL

This is a continuation of application Ser. No. 08/911,998 filed Aug. 15, 1997, which issued Nov. 23, 1999 as U.S. Pat. No. 5,990,447.

FIELD OF THE INVENTION

The application relates generally to electrode wire feeders used in welding, and, more particularly, to a wire feed speed controller for wire feeders used in welding.

BACKGROUND OF THE INVENTION

Many welding applications such as MIG (metal inert gas) or GMAW (gas metal arc welding) utilize a wire feeder to provide filler metal to the weld. Generally, the wire feeder will provide wire at a nominally constant speed (typically given in inches per minute). Wire feed speed controllers control the speed at which the wire is fed to the arc.

A typical prior art wire feeder includes a motor that pulls wire from a reel and feeds the wire to the weld arc. The motor is controlled by a wire feed controller that may be a stand alone controller or maybe part of a controller that controls other aspects of the welding process. The wire feed controller controls the speed of the wire feeder and typically includes a potentiometer on a front panel of the controller which the user uses to set wire feed speed.

A user selectable input, such as the angular position of a knob, typically determines the resistance of the potentiometer, which is used to set the speed point in the control circuit. The controller may include feedback circuitry to control the wire feed speed, or the speed control may be open loop.

The operator control panel label typically includes markings for the knob that indicate a percent of the maximum wire feed speed. The user selects the desired percentage of maximum wire feed speed. For example, at 100 percent, the wire feeder will operate at top speed, and at 50 percent the wire feeder will operate at one-half of its top speed. Wire feeder and welding machine user's manuals often include tables that indicate the percent setting on the potentiometer (knob) for various gauge (thickness) materials to be welded. Generally, lesser gauge material requires the wire be fed at a slower speed. A typical range for wire feed speeds is from 50 inches per minute for thinner material to 650 inches per minute for thicker material.

These,controls are simple and easy to implement. However, they have a significant drawback. Specifically, the potentiometer is substantially linear: the relationship between changes in angular position and changes in wire feed speed is linear over the entire range. For example, if the entire,range of wire feed speed is 600 inches per minute, and the total angular rotation 300 angular degrees, then two percent of the angular range (6 angular degrees) will result in 12 inches per minute difference in wire feed speed.

The sensitivity (inches/minute/degree of angular rotation) is determined by the relationship between angular position and wire feed speed. Thus, the precision by which wire feed speeds may be operatively selected is the same at the fast and slow end of the wire feed speed range.

However, when welding, the speed selection at the faster end of wire feed speed range (heavier gauge material) need not be as precise as the speed selection at the slower end of the wire feed speed range. For example, when operating at 600 inches per minute, being off by 5 or 10 inches per minute may not be significant. However, when operating at 50 inches per minute, being off by 5 or 10 inches per minute may be very significant and can confuse the operator since 175 inches/minute is available on both toggle switch positions. Thus, it is desirable that the control be more precise at slower wire feed speeds than at faster wire feed speeds.

Some prior art wire feed controllers overcame this drawback by providing a toggle switch to select between a faster range and a slower range. Thus, the angular sensitivity at slower speeds is greater than when using the potentiometer for the full range. However, this requires an additional control switch. Also, this prevented the use of a direct wire feed speed reading, since a single potentiometer knob was used for multiple wire feed speed ranges.

FIG. 1 is part of a panel of such a prior art wire feed control having a two-range speed control. Two control knobs are shown on this portion of the panel. Control knob 101 controls the wire feed speeds, and control knob 103 controls the output voltage (and is not particularly relevant to the present invention). Control knob 101 is part of a potentiometer which has an output provided to a controller.

A switch 102 selects between the fast and slow range of wire feed speeds. Specifically, when switch 102 is toggled to the left, the slow range (between 50 and 350 inches per minute) is selected. When switch 102 is toggled to the right, the full range (50 to 650 inches per minute) is selected. Thus, to select 175 inches per minute the user would toggle switch 102 to the left and select 50 percent on knob 101. This would provide 50 percent of the maximum (350) or 175 inches per minute. Should the user desire a wire feed speed of about 490 inches per minute switch 102 would be toggled to the right and the setting for knob 101 would be about 75 percent. This would provide approximately 490 inches per minute. However, this sort of design does not allow the wire feed speed to be displayed in inches per minute on the selector knob. Additionally, this does not allow the user to effectively access all wire feed speeds over the entire range, without toggling a switch.

Experienced welders will often know the wire feed speed necessary for the weld they are performing. Also, inexperienced welders can easily determine the necessary wire feed speed using a table or slide rule calculator. However, given the prior art wire feed speed control (which required the panel to show percent of maximum wire feed speed) even an experienced welder needed to consult the user's manual.

Another prior art wire feed controller is part of the Miller™ RCSP-45 (Remote Control Synergic Pulser) used for pulse MIG arc welding. This controller is complex and expensive and has two adjustment knobs: arc power and arc length. Neither knob directly controlled wire feed speed, although wire feed speed was determined based on the arc length and arc power selected. As used herein, a parameter is directly controlled when a selectable input—such as a knob on the operator panel—is used to control the parameter directly, rather than indirectly by altering other output parameters. The indirect control effected a non-linear change in wire feed speed for changes in arc length and arc power. However, this prior art did not allow independent control of the wire feed speed by a single knob.

Accordingly, it would be desirable to provide a wire feeder that provided an independent control of wire feed speed which was non-linear over the range of wire feed speeds. Additionally, the control should be such that the user may read the control in inches per minute, rather than percent of maximum speed.

SUMMARY OF THE PRESENT INVENTION

A first aspect of the invention is a wire feeder that feeds wire to a weld at a controllable rate. The wire feeder includes a wire feed motor with a motor speed input. A controller is coupled to the motor speed control input. A user selectable wire feed speed input is also connected to the controller. The controller has an input circuit coupled with a non-linear stage such that the relationship between the user selectable wire feed speed input and the actual wire feed speed is not linear.

An alternative embodiment is using a potentiometer mounted on a front panel as the user selectable wire feed speed input. Another alternative is to directly and independently control the wire feed speed.

Another alternative is using a gain stage having a first gain over a first range of inputs and a second gain over a second range of inputs to create the non-linearity. An alternative uses a gain stage having a varying gain to provide a gradually changing gain over the range of wire feed speeds.

Alternative embodiments include having just a controller, a controller with a wire feeder, or an entire welding machine.

Other principal features and advantages of the invention will become apparent to those skilled in the art upon review of the following drawings, the detailed description and the appended claims.

Figure 1:
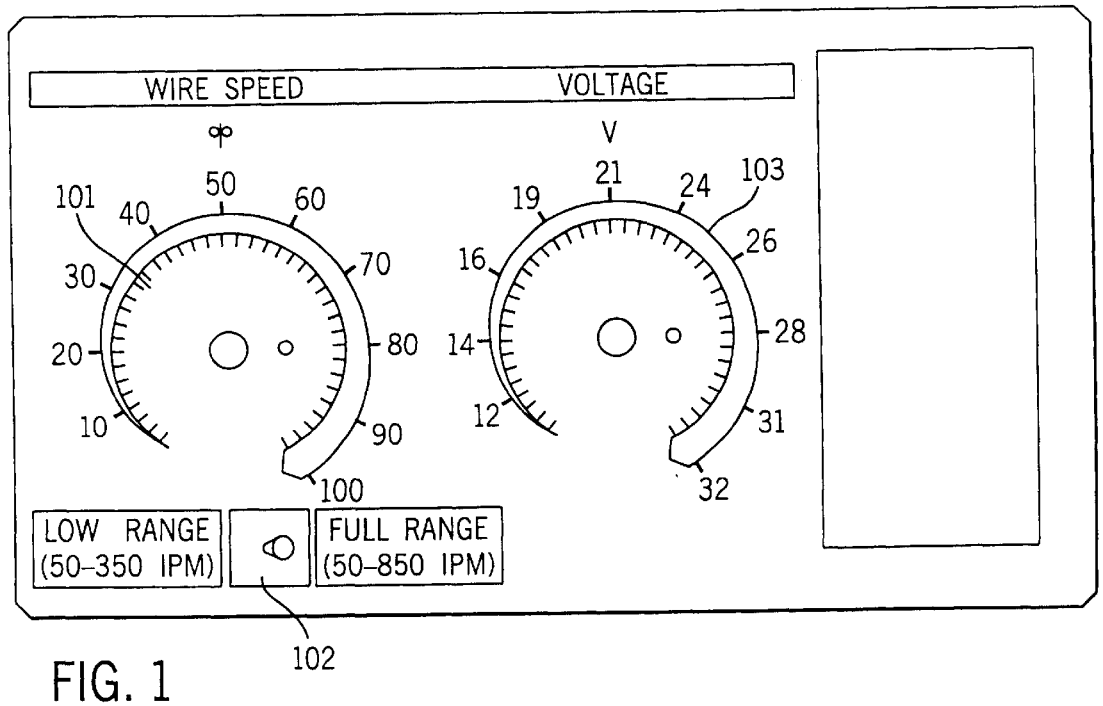
FIG. 1 is part of a front panel layout of a prior art wire feed speed controller.

Before explaining at least one embodiment of the invention in detail it is to be understood that the invention is not limited to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular front panel arrangement and a particular circuit diagram it should be understood at the outset that the wire feed speed control may be implemented with other components and lay-outs.

Generally, the present invention provides for a non-linear output of the wire feed speed control knob. The non-linear output voltage allows for greater sensitivity (per angular unit) at slower wire feed speeds, and lesser sensitivity (per angular unit) at faster wire feed speeds. This allows the wire feed speed to be displayed in inches per minute, and allows the user to effectively select a wire feed speed over an entire range using a single potentiometer, without toggling a range switch.

Figure 2:
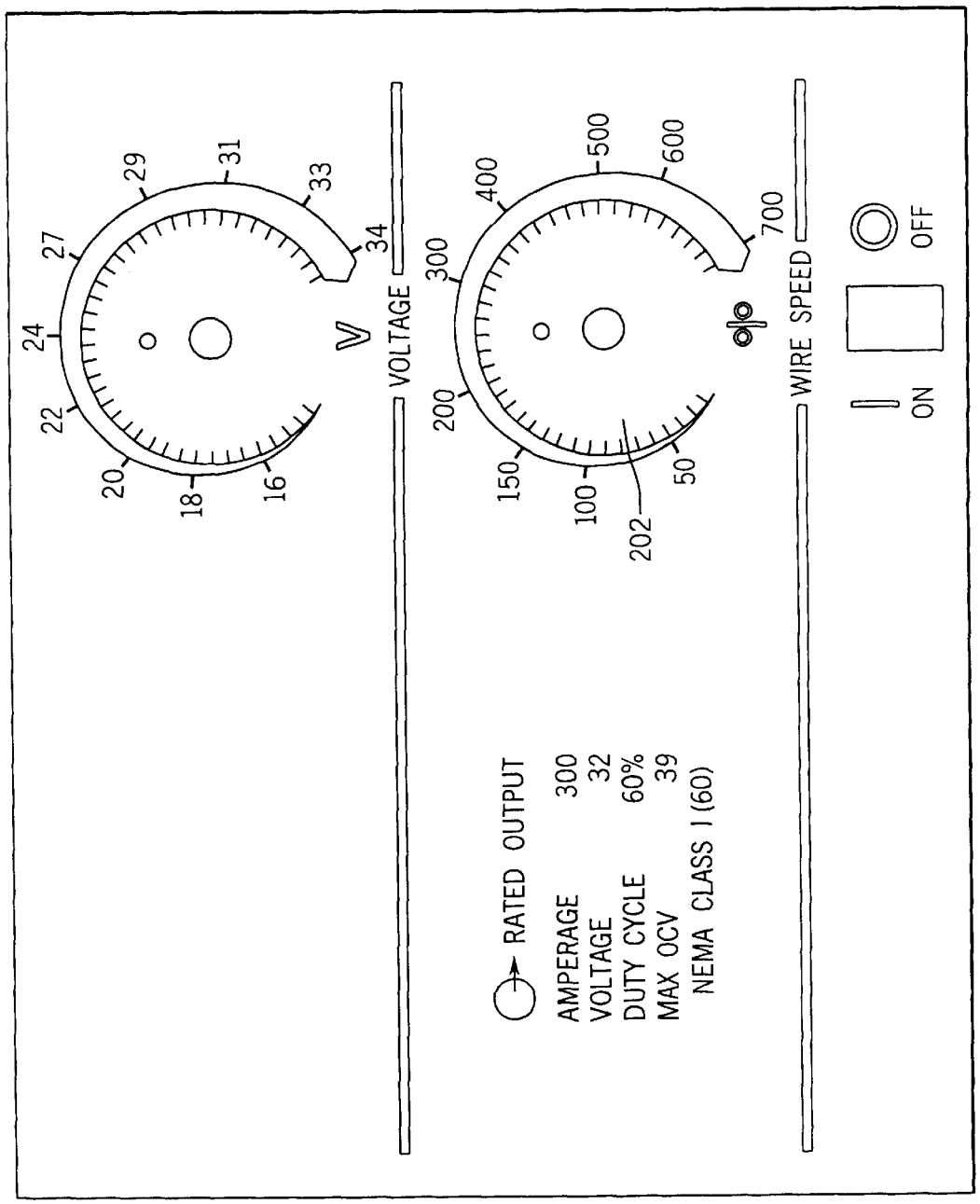
FIG. 2 is a part of a front panel layout of a wire feed speed controller that implements the present invention.

FIG. 2 shows a portion of a front panel of a wire feed speed controller (that corresponding to the portion of a prior art panel in FIG. 1) implementing the present invention. The wire feed speed is set using a knob 202 and has range of 50 to 700 inches per minute. However, it may be easily seen that the slower end of the wire feed speed has a more sensitive control. For example, the angular difference of 100 inches per minute between 50 and 150 inches per minute is much greater than the angular difference of 100 inches per minute between 600 and 700 inches per minute. Thus, the user may select a desired wire feed speed directly. The non-linear control allows inches per minute to be displayed rather than percent of maximum wire feed speed. Also, the user may effectively select the wire feed speed, even at slow speeds, because the sensitivity is lower at low speeds.

Figure 3:
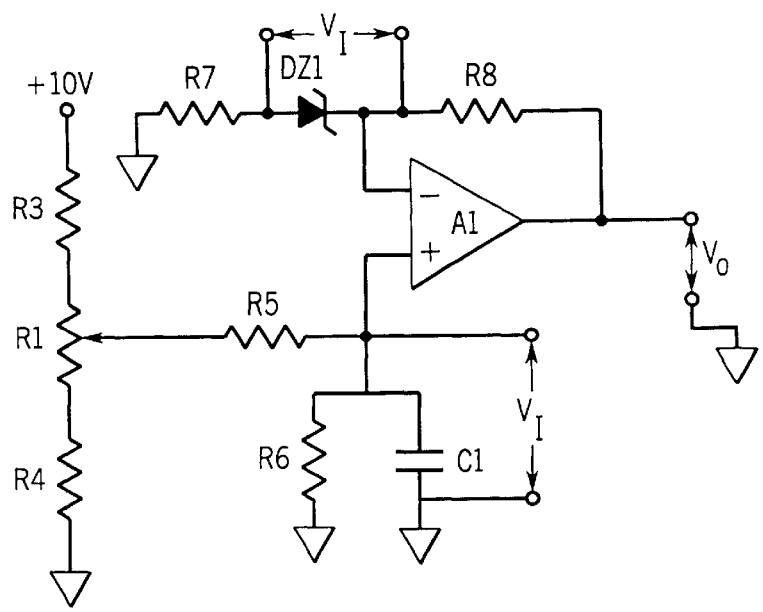
FIG. 3 is a circuit diagram used to implement part of the wire feed speed controller of the present invention.

An input circuit which implements the invention is shown in FIG. 3 and includes resistors R1–R8, an op amp A1, a capacitor C1, and a zener diode DZ1. Resistor R1 is the wire feed speed control potentiometer mounted on the front panel of the controller, and is adjusted using knob 202. The resistance of potentiometer R1 varies from 0 ohms to 1K ohms, depending upon the angular position of knob 202. Resistors R3 (562 ohms) and R4 (100 ohms) connect potentiometer R1 to a +10V voltage source and ground. The resistances of resistors R3 and R4 are selected to set the minimum and maximum voltages that the output resistor of R1 can provide. Resistor R5 (100K ohms), resistor R6 (200K ohms) and capacitor C1 (0.0047 $\mu$F) form a voltage divider and an input filter for the non-inverting input of op amp A1. Thus, the voltage from the +10 volt source, modified by the setting of potentiometer R1 and divided by resistors R3 and R4, is provided to the non-inverting input of op amp A1 through resistor R5.

Resistor R7 (6.82K ohms) and zener diode DZ1 (3.0 zener voltage), along with resistor R8 (10K ohms) form a non-linear gain network (that implements the non-linearity of wire feed speed relative to the angular position of knob 202) and are connected to the inverting input of op amp A1. The output voltage of op amp A1, V0, is given by V0=VI+(R8/R7)*(VI−VZ) when VI is greater than VZ, or V0=VI when VI is less than or equal to VZ. Thus, it may be seen that the output of op amp A1 will depend upon the setting of potentiometer R1, but will not vary linearally with the setting of potentiometer R1.

The output of op amp A1, V0, is provided to the controller which uses it to set the wire feed speed. The wire is fed by a wire feed motor, which has a speed control input from the controller. This embodiment provides two discrete sensitivities, one when VI>Vz, and one when VI<=VZ. Other alternatives include a greater number of sensitivities or a gradually changing sensitivity.

The preferred embodiment uses the output of op amp A1 as the input to a PWM chip (UC 3524 e.g.) and then modulates a voltage (i.e. a wire feed speed input) applied to a dc permanent magnet motor. The speed of the motor is dependent on the average modulated voltage applied thereto. Other motor controllers can be used to implement this invention. One alternative provides non-linearities in the wire feed motor be compensated for by the input circuit. Another alternative provides for depressing a button or rotating a wheel for the selectable input.

The controller may be a stand alone unit, part of the controller for the welding machine, or an add on. The total package may include a welding power supply in the same or a separate case as the controller, or a wire feeder in a case with the controller, or each component having its own case.

Numerous modifications may be made to the present invention which still fall within the intended scope hereof. Thus, it should be apparent that there has been provided in accordance with the present invention a method and apparatus for controlling a wire feeder that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. An apparatus for feeding wire at a controllable wire feed speed to a weld comprising:
    a wire feed motor, having a wire feed speed;
    a controller, having a controller input, and having a speed output coupled to the wire feed motor; and
    a user selectable input device coupled to the controller input;
    wherein the relationship between the user selectable input device and the wire feed speed is not linear, and the non-linearity does not require an adjustment of a second user-selectable input.

2. The apparatus of claim 1 wherein the user selectable input device includes a rotatable device mounted on a control panel, and the relationship between the angular position of the rotatable device and the wire feed speed is not linear.

3. The apparatus of claim 2 wherein a graph of the wire feed speed versus the angular position has at least two different slopes.

4. The apparatus of claim 2 wherein the rotatable device is a potentiometer.

5. The apparatus of claim 2 including an input circuit connected between the user selectable input device and the controller.

6. The apparatus of claim 5 wherein the input circuit includes a non-linear gain stage connected between the user selectable input device and the controller.

7. The apparatus of claim 1 wherein the user selectable input device includes a depressable button on a control panel.

8. An apparatus for feeding wire at a controllable wire feed speed to a weld comprising:
    a wire feed motor, having a wire feed speed;
    a controller means for controlling the speed of the motor in response to a controller input; and
    a user selectable input device means for allowing the user to select a wire feed speed, coupled to the controller input;
    wherein the relationship between the user selectable input device means and the wire feed speed is not linear, and the non-linearity does not require an adjustment of a second user-selectable input.

9. The apparatus of claim 8 wherein the user selectable input device means includes a means for rotating, mounted on a control panel, and the relationship between the angular position of the means for rotating and the wire feed speed is not linear.

10. The apparatus of claim 9 wherein a graph of the wire feed speed versus the angular position has at least two different slopes.

11. A method of controlling a wire feeder comprising:
    providing a user input from a user input device; and
    providing the wire at a controlled speed in response to the user input, such that there is a non-linear relationship between the user input device and the wire feed speed, and the non-linearity does not require changing a second user input.

12. The method of claim 11 wherein providing a user input includes providing a user input from a rotatable device mounted on a control panel, and wherein the slope of the wire feed speed versus an angular position of the rotatable device has at least two values.

13. The method of claim 12 wherein providing a user input includes providing a user input from a potentiometer mounted on a control panel.

14. The method of claim 13 further including sensed a voltage from the potentiometer, and providing a control signal in response to the sensed voltage.

15. The method of claim 11 wherein providing a user input includes providing a signal from a button mounted on a control panel.

16. An apparatus for controlling the rate at which wire is fed to a weld, comprising:
    a wire feed motor output;
    a wire feed speed input selectable from a range of wire feed speeds; and
    a user selectable input device coupled to the controller input such that the relationship between the user selectable input device and the wire feed speed is not linear, and the non-linearity does not require an adjustment of a second user-selectable input.

17. The apparatus of claim 16 wherein the user selectable input device includes a rotatable device mounted on a control panel, and the relationship between the angular position of the rotatable device and the wire feed speed is not linear.

18. The apparatus of claim 17 wherein a graph of the wire feed speed versus the angular position has at least two different slopes.

19. The apparatus of claim 18 wherein the rotatable device is a potentiometer.

20. The apparatus of claim 19 including an input circuit connected between the user selectable input device and the controller.

21. The apparatus of claim 20 wherein the input circuit includes a non-linear gain stage connected between the user selectable input device and the controller.

22. The apparatus of claim 16 wherein the user selectable input device includes a depressable button on a control panel.

23. An apparatus for arc welding comprising:
    a welding power supply connected to provide welding power to the arc;
    a wire feed motor, disposed to provide wire to the arc and having a wire feed speed;
    a controller, having a controller input, and having a speed output coupled to the wire feed motor; and
    a user selectable input device coupled to the controller input;
    wherein the relationship between the user selectable input device and the wire feed speed is not linear, and the non-linearity does not require an adjustment of a second user-selectable input.

24. The apparatus of claim 23 wherein the user selectable input device includes a rotatable device mounted on a control panel, and the relationship between the angular position of the rotatable device and the wire feed speed is not linear.

25. The apparatus of claim 24 wherein a graph of the wire feed speed versus the angular position has at least two different slopes.

26. The apparatus of claim 24 wherein the rotatable device is a potentiometer.

27. The apparatus of claim 24 including an input circuit connected between the user selectable input device and the controller.

28. The apparatus of claim 27 wherein the input circuit includes a non-linear gain stage connected between the user selectable input device and the controller.

29. The apparatus of claim 23 wherein the user selectable input device includes a depressable button on a control panel.

30. An apparatus for arc welding comprising:
- a welding power supply connected to provide welding power to the arc;
- a wire feed motor, disposed to provide wire to the arc, and having a wire feed speed;
- a controller means for controlling the speed of the motor in response to a controller input; and
- a user selectable input device means for allowing the user to select a wire feed speed, coupled to the controller input;
- wherein the relationship between the user selectable input device means and the wire feed speed is not linear, and the non-linearity is not dependent upon an adjustment of a second user-selectable input.

31. The apparatus of claim 30 wherein the user selectable input device means includes a means for rotating, mounted on a control panel, and the relationship between the angular position of the means for rotating and the wire feed speed is not linear.

32. The apparatus of claim 31 wherein a graph of the wire feed speed versus the angular position has at least two different slopes.

33. A method of welding comprising:
- providing welding power to an arc;
- providing a user input from a user input device; and
- providing wire to the arc at a controlled speed in response to the user input, such that there is a non-linear relationship between the user input device and the wire feed speed, and the non-linearity does not require an adjustment of a second user-selectable input.

34. The method of claim 33 wherein providing a user input includes providing a user input from a rotatable device mounted on a control panel, and wherein the slope of the wire feed speed versus an angular position of the rotatable device has at least two values.

35. The method of claim 34 wherein providing a user input includes providing a user input from a potentiometer mounted on a control panel.

36. The method of claim 35 further including sensing a voltage from the potentiometer, and providing a control signal in response to the sensed voltage.

37. The method of claim 33 wherein providing a user input includes providing a signal from a button mounted on a control panel.

* * * * *